(12) United States Patent
Rothschild

(10) Patent No.: US 10,496,861 B2
(45) Date of Patent: Dec. 3, 2019

(54) METHOD AND SYSTEM FOR CREATING A SYMBOLOGY RELATED TO A CAPTURED IMAGE

(71) Applicant: Leigh M. Rothschild, Miami, FL (US)

(72) Inventor: Leigh M. Rothschild, Miami, FL (US)

(*) Notice: Subject to any disclaimer, the term of this patent is extended or adjusted under 35 U.S.C. 154(b) by 0 days.

(21) Appl. No.: 15/807,837

(22) Filed: Nov. 9, 2017

(65) Prior Publication Data
US 2018/0129844 A1 May 10, 2018

Related U.S. Application Data

(60) Provisional application No. 62/419,564, filed on Nov. 9, 2016.

(51) Int. Cl.
*G06K 7/10* (2006.01)
*G06K 19/06* (2006.01)
(Continued)

(52) U.S. Cl.
CPC ........ *G06K 7/10722* (2013.01); *G06K 7/1413* (2013.01); *G06K 7/1417* (2013.01);
(Continued)

(58) Field of Classification Search
CPC .................................................. G06K 7/10722
(Continued)

(56) References Cited

U.S. PATENT DOCUMENTS

| | | | |
|---|---|---|---|
| 2005/0072846 A1* | 4/2005 | Lubow | G06K 19/06028 235/462.01 |
| 2014/0061293 A1* | 3/2014 | Jayaprakash | G06F 17/30879 235/375 |

(Continued)

*Primary Examiner* — Allyson N Trail (57) ABSTRACT

A method and system for accessing details of an object present in an image is disclosed. The method comprises receiving and storing an image into a repository. The image may comprise an object captured within the image. The object present in the image may be analysed to determine features comprising size details of the object, a colour theme of the object, a background colour theme of the object, subject matter of the object, and other image attributes. Details related to the object may be received from a user. The details may comprise at least one of a description of the object, contact information of the user, price of the object, web link to a site providing information about the object, e-commerce link to purchase the object, a link to enable receiving information about the object on a user device, audio related to the object, video related to the object, and text related to the object. The details related to the object may be stored into the repository. A symbol encoding an identifier of the image and a location of the repository, may be determined. The image and the details may be related to the object present in the image are stored. The symbol may be at least one of a bar code, Quick Response (QR) code, photosymbol, and a hologram. The symbol on the image may be embedded based on at least one of predefined user preferences, a user input, and analysis of the image by the processor. A user request may be received to access the details of the object. The user request may be placed by at least one of the user and another user. The user request may comprise the symbol present in a scanned format. At least one of the user and another user may be directed to the location of the repository, based on the user request.

20 Claims, 5 Drawing Sheets

(51) Int. Cl.
*G06K 7/14* (2006.01)
*G06T 11/00* (2006.01)
*G06T 7/90* (2017.01)
*G06T 7/60* (2017.01)

(52) U.S. Cl.
CPC ........ *G06K 19/06103* (2013.01); *G06T 11/00* (2013.01); *G06T 11/001* (2013.01); *G06T 7/60* (2013.01); *G06T 7/90* (2017.01)

(58) Field of Classification Search
USPC .......................................... 235/375, 462.01
See application file for complete search history.

(56) References Cited

U.S. PATENT DOCUMENTS

| | | | |
|---|---|---|---|
| 2015/0098096 A1* | 4/2015 | Hashimoto | G06F 3/1285 358/1.6 |
| 2015/0324946 A1* | 11/2015 | Arce | G06T 1/0021 382/251 |
| 2018/0260671 A1* | 9/2018 | Chen | G06K 19/06037 |
| 2018/0276781 A1* | 9/2018 | Oliveria | G06T 7/90 |

* cited by examiner

METHOD AND SYSTEM FOR CREATING A SYMBOLOGY RELATED TO A CAPTURED IMAGE

CROSS-REFERENCE TO RELATED APPLICATION

This application claims priority from U.S. Provisional Application 62/419,564, filed Nov. 9, 2016.

FIELD OF THE DISCLOSURE

The present disclosure is generally related to image processing and more particularly to embedding information about objects in an image and allowing access of the embedded information to a user.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

In order to explore a person, place, or an object, a person generally explores on the Internet. The person may search on an internet search engine like Google™ to find information related to the object. The user may enter general details related to the object as search queries on the internet search engine. For an example, to find details of a particular hotel, the user may provide a search query as "Central Park Hotel, London." As a response to his search query, the user may find several search results for providing details of the hotel.

One of the search results may provide a location of the hotel. Another search result may direct the user to a web link showing prices of rooms in the hotel. Similarly, the user may use the search results to check images of the hotel, availability of rooms, facilities provided in the hotel. Thus, the user has to put on a large effort to access all necessary details of an interested object.

Thus, a convenient method and system of accessing information about any person, place or object of interest is much desired.

BRIEF SUMMARY

It will be understood that this disclosure is not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only and is not intended to limit the scope of the present disclosure.

In an example embodiment, method of accessing details of an object present in an image is provided. The method may comprise receiving and storing an image into a repository. The image may comprise an object captured within the image. The method may further comprise analysing the object present in the image to determine features comprising size details of the object, a colour theme of the object, a background colour theme of the object, subject matter of the object, and other image attributes. The method may further comprise receiving details related to the object from a user. The details may comprise at least one of a description of the object, contact information of the user, price of the object, web link to a site providing information about the object, e-commerce link to purchase the object, a link to enable receiving information about the object on a user device, audio related to the object, video related to the object, and text related to the object. The method may further comprise storing the details related to the object into the repository. The method may further comprise determining a symbol encoding an identifier of the image and a location of the repository where the image and the details related to the object present in the image are stored. The symbol may be at least one of a bar code, Quick Response (QR) code, photosymbol, and a hologram. The method may further comprise embedding the symbol on the image based on at least one of predefined user preferences, a user input, and analysis of the image by the processor. The method may further comprise receiving a user request to access the details of the object. The user request may be placed by at least one of the user and another user. The user request may comprise the symbol present in a scanned format. The method may further comprise directing at least one of the user and another user to the location of the repository, based on the user request, thereby allowing access of the details related to the object.

In an example embodiment, another method of accessing details of an object present in an image is provided. The method may comprise receiving and storing an image into a repository. The image may comprise an object captured within the image. The method may further comprise analysing the object present in the image to determine features comprising size details of the object, a colour theme of the object, a background colour theme of the object, subject matter of the object, and other image attributes. The method may further comprise receiving details related to the object from a user. The details may comprise at least one of a description of the object, contact information of the user, price of the object, web link to a site providing information about the object, e-commerce link to purchase the object, a link to enable receiving information about the object on a user device, audio related to the object, video related to the object, and text related to the object. The method may further comprise storing the details related to the object into the repository. The method may further comprise determining a symbol encoding an identifier of the image and a location of the repository where the image and the details related to the object present in the image are stored. The symbol may be at least one of a bar code, Quick Response (QR) code, photosymbol, and a hologram. The method may further comprise printing the symbol, by the user. The method may further comprise attaching the symbol, on the image, by the user. The method may further comprise receiving a user request to access the details of the object. The user request may be placed by at least one of the user and another user. The user request may comprise the symbol present in a scanned format. The method may further comprise directing at least one of the user and another user to the location of the repository, based on the user request, thereby allowing access of the details related to the object.

In another example embodiment, a system for accessing details of an object present in an image is provided. The system may comprise capturing an image of an object. The system may further comprise storing the image into a repository. The system may further comprise analysing the object present in the image to determine features comprising size details of the object, a colour theme of the object, a background colour theme of the object, subject matter of the object, and other image attributes. The system may further comprise receiving details related to the object, from a user. The details may comprise at least one of a description of the object, contact information of the user, price of the object, web link to a site providing information about the object, e-commerce link to purchase the object, a link to enable receiving information about the object on a user device, audio related to the object, video related to the object, and text related to the object. The system may further comprise storing the details related to the object into the repository. The system may further comprise determining a symbol encoding an identifier of the image and a location of the repository where the image and the details related to the object present in the image are stored. The symbol may be at least one of a bar code, Quick Response (QR) code, photosymbol, and a hologram. The system may further comprise embedding the symbol on the image based on at least one of predefined user preferences, a user input, and analysis of the image by the processor. The system may further comprise receiving a user request to access the details of the object. The user request may be placed by at least one of the user and another user. The user request may comprise the symbol present in a scanned format. The system may further comprise directing at least one of the user and another user to the location of the repository, based on the user request, thereby allowing access of the details related to the object.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

A processor 110 may execute computer program instructions stored in a memory 112. The processor 110 may also be configured to decode and execute any instructions received from one or more other electronic devices or one or more servers. The processor 110 may include one or more general purpose processors (e.g., INTEL microprocessors) and/or one or more special purpose processors (e.g., digital signal processors or Xilinx System On Chip (SOC) Field Programmable Gate Array (FPGA) processor). The processor 110 may be configured to execute one or more computer-readable program instructions, such as program instructions to carry out any of the functions described in this description.

The memory 112 may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions.

Interface(s) 108 may be used to communicate with a user. The interface(s) 108 may be used either to accept an input from the user or provide an output to the user, or perform to both actions. The interface(s) 108 may either be a Command Line Interface (CLI) or a Graphical User Interface (GUI).

The communication network 104 may be implemented using at least one communication technique selected from Visible Light Communication (VLC), Worldwide Interoperability for Microwave Access (WiMAX), Long term evolution (LTE), Wireless local area network (WLAN), Infrared (IR) communication, Public Switched Telephone Network (PSTN), Integrated Services Digital Network (ISDN), Broadband, Optical Fibre network, and Radio waves.

Figure 1:
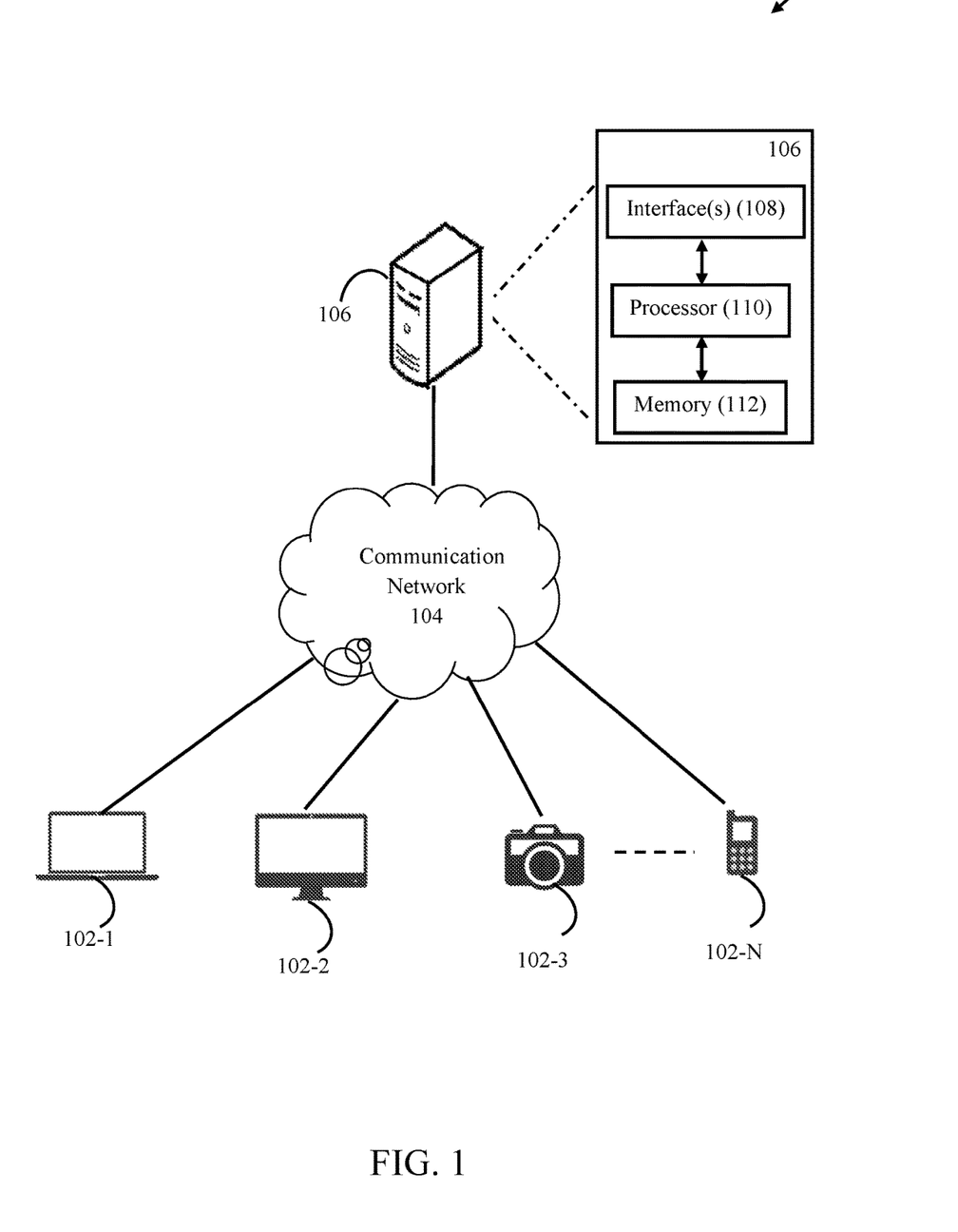
FIG. 1 illustrates a network connection diagram 100 of a system for accessing details of an object present in an image, according to an embodiment.

FIG. 1 illustrates a network connection diagram 100 of a system for accessing details of an object present in an image, according to an embodiment. Current implementation uses a user device 102-1 to 102-N. In one case, the user device may be a camera 102-3 to capture images. The user device may also be a laptop 102-1, desktop 102-2, tablet, cellular phone 102-N and similar others. The cellular phones may be running on operating systems such as Android™, IOS™, and Windows™.

In an embodiment, a user may capture an image of an object. In one case, the user may capture the image of a painting by an image capturing unit. In one case, the image capturing unit may be present in the camera 102-N. The camera 102-N may use a Charge Coupled Device (CCD) or a Complementary Metal Oxide Semiconductor (CMOS) sensor. The image may be recorded in a suitable image format like Joint Photographic Experts Group (JPEG), Exchangeable image file format (Exif), Tagged Image File Format (TIFF), Raw Image Format (RAW), Graphics Interchange Format (GIF), Bitmap format (BMP), and Portable Network Graphics (PNG). The image may be transmitted to a server 106 over the communication network 104. The server 106 may store the image in a repository maintained in the memory 112 of the server 106.

Post receiving the image at the server 106, the processor 110 of the server 106 may perform analysis of the object present in the image. In one case, the object present in the image may be analysed using a scanning technique selected from a group consisting of pixel to pixel recognition, hash based search, Hugh transform, and geometry consistency. The processor 110 may perform the analysis to determine features of the object present in the image. The features may comprise size details of the object, a colour theme of the object, a background colour theme of the object, subject matter of the object, and other image attributes.

Upon performing analysis of the image, the processor 110 may receive details related to the object, from a user. The details may comprise at least one of a description of the object, contact information of the user, price of the object, web link to a site providing information about the object, e-commerce link to purchase the object, a link to enable receiving information about the object on a user device, audio related to the object, video related to the object, and text related to the object. The processor 110 may store the details related to the object, along with the object, in the repository maintained in the memory 112. In one case, the location for storing the details of the object may be defined by a user.

In one embodiment, the processor 110 may determine details related to the object by processing the image comprising the object. In one case, the processor 110 may use the image to perform an image search on Internet. Based on the image search, the processor 110 may retrieve the description of the object present in the image. In another case, the processor 110 may accept the title of the object from the user. Further, the processor 110 may use the title of the object to perform a text search on the Internet. Using the title, the processor 110 may determine the e-commerce link to purchase the object, price of the object, web link to the site providing information about the object, and other important details related to the object.

Successively, the processor 110 may determine a symbol encoding an identifier of the image and a location of the repository where the image and the details related to the object present in the image are stored. The symbol may be at least one of a bar code, Quick Response (QR) code, photosymbol, and a hologram. The bar code may be at least one of a Universal Product Code (UPC), European Article Number (EAN), and a PDF417 code.

In one embodiment, the processor 110 may determine a symbol to be used in the image. The processor 110 may determine the one symbol amongst the bar code, QR code, photosymbols, and the hologram. The processor 110 may determine the symbol based on content of the image. In one case, the processor 110 may determine the symbol based on a number of objects present in the image, colour tone of the image, and density of content in the image, to determine the symbol. The processor 110 may determine two symbols of different types to be used in the image. For an example, the processor 110 may determine a QR code and a photosymbol as the symbols to be used in an image.

In one embodiment, the processor 110 may determine the symbol based on a user input. The user input may be present in form of a voice command, a text, or a symbol. The processor 110 may process the user input to determine the symbol to be used in the image. In one case, the user preferences may be pre stored in memory connected to the processor. The user preferences may define a type of symbol to be used by the processor 110 based on contents of the image. The contents of the image used by the processor 110 may include a number of objects present in the image, colour tone of the image, and a density of content in the image.

In one embodiment, the QR code may be used as an identifier, by the processor 110. The QR code is a matrix barcode comprising encoded information. The QR code may comprise encoded content of the identifier of the image. The identifier may be at least one of a date and time of capturing the image, place where the image was captured, or information related to content of the image. Further, the QR code may comprise a location of the repository where the image and the details related to the image are stored. In one case, the location of the repository may be present in form of an Internet Protocol (IP) address or a uniform Resource Locator (URL). The IP address may either be of 32 bit size i.e. IPv4 or of 128 bit size i.e. IPv6.

In one embodiment, the identifiers i.e. date and time of capturing the image, place where the image was captured, information related to content of the image, and location of the repository where the image and the details related to the image are stored may be encoded and stored in any version of the QR code. The version may range from version 1 to version 40 of the QR code, but may not be limited within the range. The highest version, i.e. version 40, may accommodate 1276 bytes of data. Further, a High Capacity Colored 2-Dimensional (HCC2D) QR code may also be used as the symbol to accommodate more data related to the image. In one case, the QR code may be generated using a mobile application installed in any of the user devices 102-A to 102-N. In one embodiment, the user may print the symbol. In one case, the symbol may be a QR code. Successively, the user may place the QR code on the image comprising the object. Thus, the QR code may be manually attached to the image by the user.

In one embodiment, the symbol may be embedded on the image by the processor 110. In one case, the symbol may be a QR code or any other symbol. The QR code may be embedded based on at least one of predefined user preferences, a user input, and analysis of the image. In one case, the predefined user preferences may comprise a size of the symbol, a colour of the symbol, a position of the symbol, and an orientation of the symbol embedding on the image. Thus, the processor 110 may embed the QR code on the image based on at least one of the predefined user preferences.

In another case, the QR code or any other symbol may be embedded on the image based on the analysis of the image by the processor 110. During such case, the processor 110 may determine a colour tone of the object in the image to match a colour of the QR code with the object. Further, the processor 110 may determine a void area of the image not covered by the object, to place the QR code in the void area. Further, the processor 110 may determine a size of the symbol to perfectly position the QR code in the void area of the image.

In one embodiment, the QR code may be embedded on the image based on the user input. During such case, the processor 110 may accept the user input to set the size of the QR code, colour of the QR code, position of the QR code, and the orientation of the QR code embedding on the image. Thus, based on the user input, the processor 110 may match the QR code with the object to create the QR code of a colour similar to the object, while embedding the QR code on the image. Further, the processor 110 may allow editing of the QR code based on the user input. During editing, the processor 110 may change the size, location, and the orientation of the QR code. Further, an image present in the QR code may be changed based on the user input.

Figure 2:
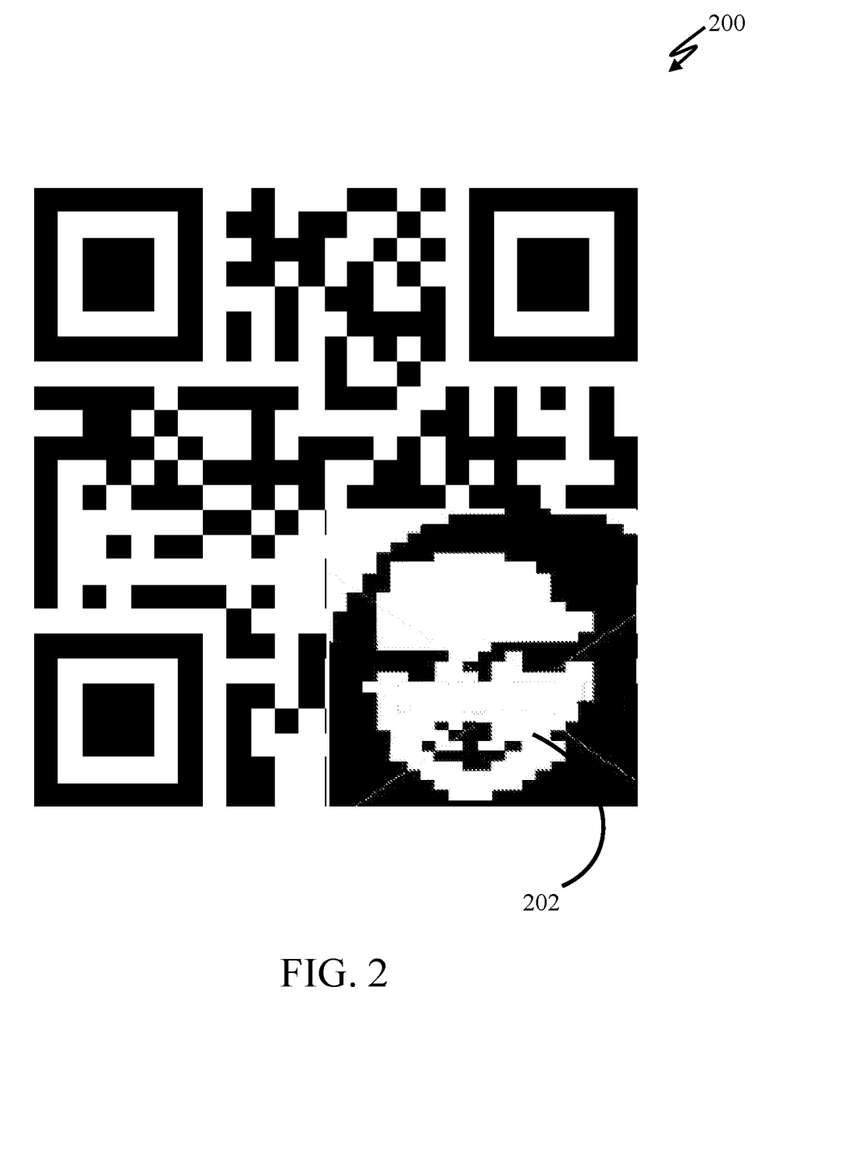
FIG. 2 illustrates a Quick Response (QR) code 200 comprising image of an object, according to an embodiment.

In an embodiment, the object present in the image may be inserted in the QR code. FIG. 2 illustrates a QR code 200 of the image. The QR code 200 comprises the object 202 present in a bottom right corner of the QR code 200. Inserting the object in the QR code 200 does not affect readability of the QR code 200. The QR codes use Reed-Solomon error correction algorithm and thus does not get affected easily. Such QR codes may be stored by the user as an image. The user may easily identify such QR codes by the image present in the QR codes.

Figure 3:
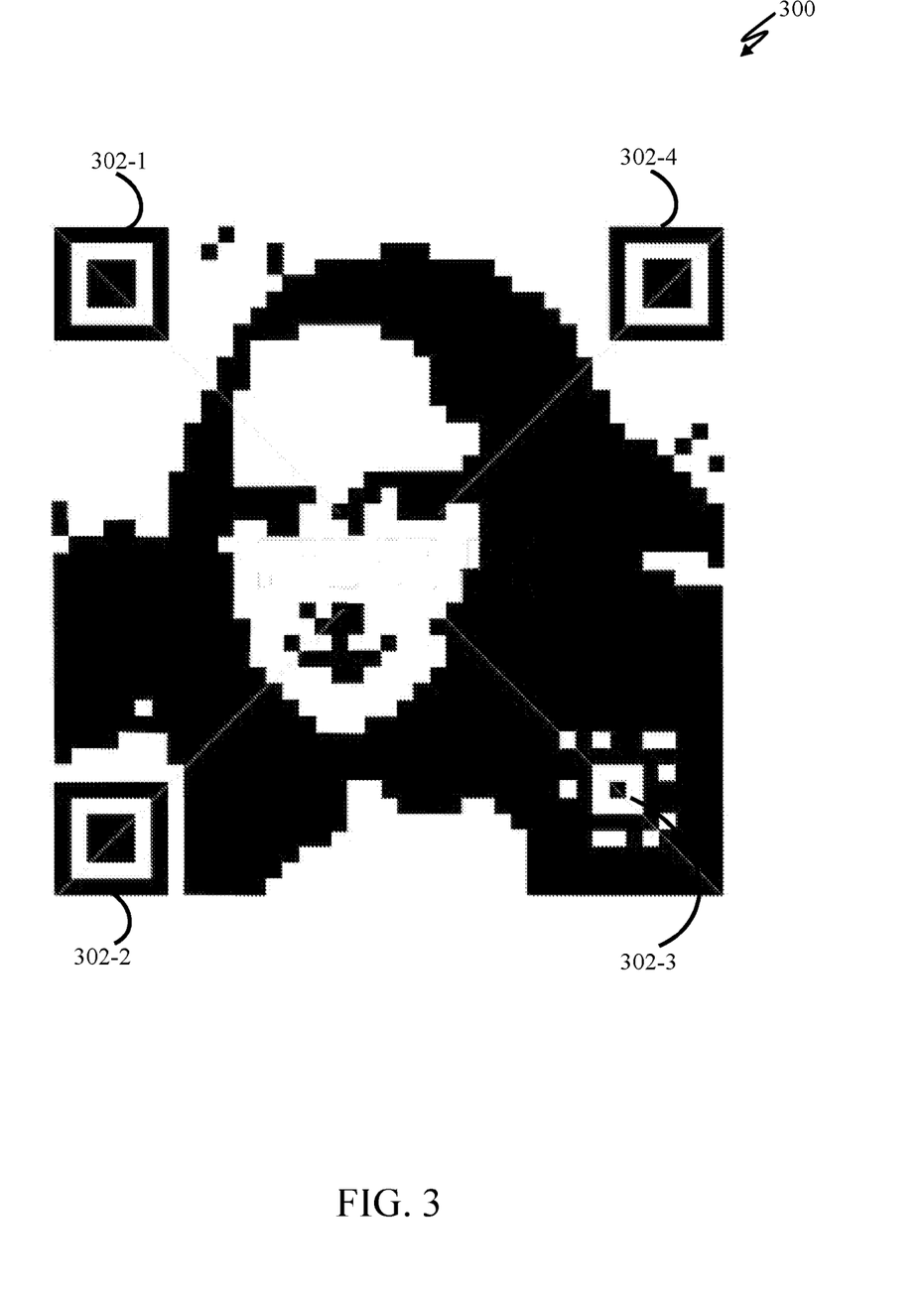
FIG. 3 illustrates an image 300 comprising an object and a symbol embedded on the image, according to an embodiment.

An exemplary embodiment is illustrated in FIG. 3 showing an image 300 comprising an object and a symbol embedded on an image. FIG. 3 shows QR codes (302-1 to 302-4) present as the symbol.

Once, the image comprising the object is tagged with the QR code, a user interested in the object may scan the QR code. The user may scan the QR code using an application installed on a user device held with the user. Post scanning, the user device may send a user request to the processor 110 to access the details of the object. The processor 110, upon receiving the user request may direct the user to the location of the repository comprising the image having the object and the details of the object stored along with the image. Thus, the user may be allowed access of the details of the object in above described manner.

The image embedded with the symbol may be hosted on e-commerce websites, social networking sites, or any other public forum and may be sent to other users via communication services. The above explained method reduces the burden of exploring about the object, by a user. The user may easily scan the symbol embedded on the image to get details and an access of an object present in the image.

Figure 4:
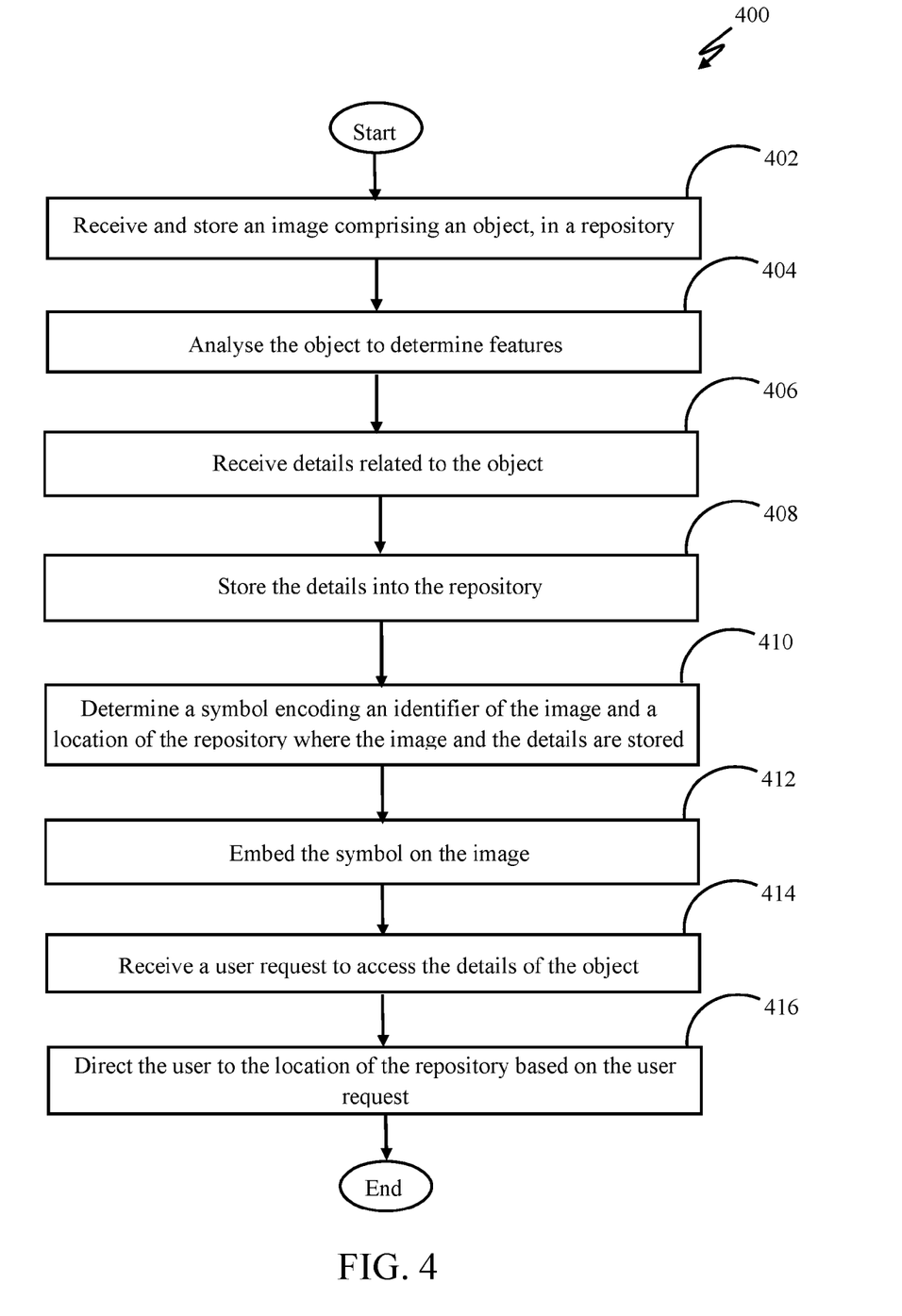
FIG. 4 illustrates a flowchart 400 of a method of accessing details of an object present in an image, according to an embodiment.

FIG. 4 illustrates a flowchart 400 of a method of accessing details of an object present in an image, according to an embodiment. FIG. 4 comprises a flowchart 400 that is explained in conjunction with the elements disclosed in FIG. 1.

The flowchart 400 of FIG. 4 shows the architecture, functionality, and operation for marking objects present in an image. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 4 may in fact be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 400 starts at the step 402 and proceeds to step 416.

At step 402, an image comprising an object may be received and stored in a repository. In one embodiment, the image may be received and stored by the processor 110.

At step 404, an analysis of the object may be performed to determine features. The features may comprise size details of the object, a colour theme of the object, a background colour theme of the object, and other image attributes. In one embodiment, the analysis may be performed by the processor 110.

At step 406, details related to the object may be received from a user. The details may comprise at least one of a description of the object, contact information of the user, price of the object, web link to a site providing information about the object, ecommerce link to purchase the object, a link to enable receiving information about the object on a user device, audio related to the object, video related to the object, and text related to the object. In one embodiment, the details related to the object may be received by the processor 110.

At step 408, the details related to the object may be stored into the repository. In one embodiment, the details related to the object may be stored by the processor 110.

At step 410, a symbol encoding an identifier of the image and a location of the repository where the image and the details related to the object present in the image are stored may be determined. The symbol may be at least one of a bar code, Quick Response (QR) code, and a hologram. In one embodiment, the symbol may be determined by the processor 110.

At step 412, the symbol may be embedded on the image based on at least one of predefined user preferences, a user input, and analysis of the image by the processor. In one embodiment, the symbol may be embedded on the image by the processor 110.

At step 414, a user request may be received to access the details of the object. The user request may be sent by at least one of the user and another user. The user request may comprise the symbol in a scanned format. In one embodiment, the user request may be received by the processor 110.

At step 416, at least one of the user and another user may be directed to the location of the repository, based on the user request. In one embodiment, at least one of the user and another user may be directed to the location of the repository, by the processor 110.

Figure 5:
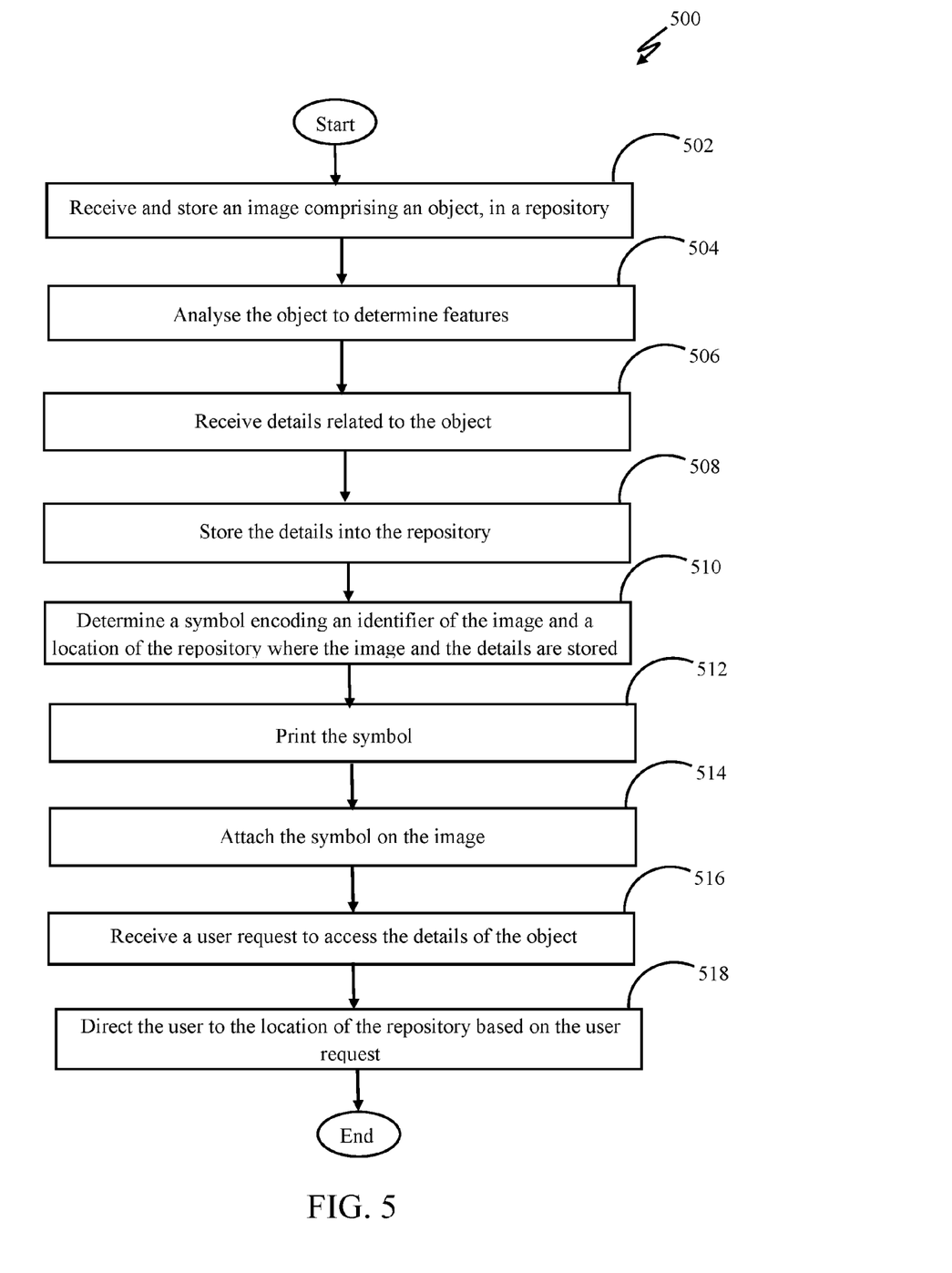
FIG. 5 illustrates a flowchart 500 of a method of accessing details of an object present in an image, according to an embodiment.

FIG. 5 illustrates a flowchart 500 of a method of accessing details of an object present in an image, according to an embodiment. FIG. 5 comprises a flowchart 500 that is explained in conjunction with the elements disclosed in FIG. 1.

The flowchart 500 of FIG. 5 shows the architecture, functionality, and operation for marking objects present in an image. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 5 may in fact be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 500 starts at the step 502 and proceeds to step 518.

At step 502, an image comprising an object may be received and stored in a repository. In one embodiment, the image may be received and stored by the processor 110.

At step 504, an analysis of the object may be performed to determine features. The features may comprise size details of the object, a colour theme of the object, a background colour theme of the object, and other image attributes. In one embodiment, the analysis may be performed by the processor 110.

At step 506, details related to the object may be received from a user. The details may comprise at least one of a description of the object, contact information of the user, price of the object, web link to a site providing information about the object, ecommerce link to purchase the object, a link to enable receiving information about the object on a user device, audio related to the object, video related to the object, and text related to the object. In one embodiment, the details related to the object may be received by the processor 110.

At step 508, the details related to the object may be stored into the repository. In one embodiment, the details related to the object may be stored by the processor 110.

At step 510, a symbol encoding an identifier of the image and a location of the repository where the image and the details related to the object present in the image are stored may be determined. The symbol may be at least one of a bar code, Quick Response (QR) code, and a hologram. In one embodiment, the symbol may be determined by the processor 110.

At step 512, the symbol may be printed. The symbol may be printed by the user.

At step 514, the symbol may be attached with the image. The symbol may be attached by the user.

At step 516, a user request may be received to access the details of the object. The user request may be sent by at least one of the user and another user. The user request may comprise the symbol in a scanned format. In one embodiment, the user request may be received by the processor 110.

At step 518, at least one of the user and another user may be directed to the location of the repository, based on the user request. In one embodiment, at least one of the user and another user may be directed to the location of the repository, by the processor 110.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A method of accessing details of an object present in an image, the method comprising:

receiving and storing, by a processor, an image into a repository, wherein the image comprises an object captured within the image;

analysing, by the processor, the object present in the image to determine features comprising size details of the object, a colour theme of the object, a background colour theme of the object, subject matter of the object;

receiving, by the processor, details related to the object from a user, wherein the details comprise at least one of a description of the object, contact information of the user, price of the object, web link to a site providing information about the object, e-commerce link to purchase the object, a link to enable receiving information about the object on a user device, audio related to the object, video related to the object, and text related to the object;

storing, by the processor, the details related to the object into the repository;

determining, by the processor, a symbol encoding an identifier of the image and a location of the repository where the image and the details related to the object present in the image are stored, wherein the symbol is at least one of a bar code, Quick Response (QR) code, photosymbol, and a hologram;

embedding, by the processor, the symbol on the image based on at least one of predefined user preferences, a user input, and analysis of the image by the processor;

receiving, by the processor, a user request to access the details of the object, wherein the user request is placed by at least one of the user and another user, and wherein the user request comprises the symbol present in a scanned format; and directing, by the processor, at least one of the user and another user to the location of the repository, based on the user request, thereby allowing access of the details related to the object.

2. The method of claim 1, wherein the object present in the image is analysed using a scanning technique selected from a group consisting of pixel to pixel recognition, hash based search, Hugh transform, and geometry consistency.

3. The method of claim 1, further comprising matching the symbol with the object to create the symbol of a colour similar to the object while embedding the symbol on the image.

4. The method of claim 1, further comprising editing the symbol for changing a size, location, and orientation of the symbol and changing an image present in the symbol.

5. The method of claim 1, further comprising suggesting a location for embedding the symbol on the image.

6. The method of claim 1, further comprising inserting the object present in the image, in the QR code.

7. A method of accessing details of an object present in an image, the method comprising:
    receiving and storing, by a processor, an image into a repository, wherein the image comprises an object captured within the image;
    analysing, by the processor, the object present in the image to determine features comprising size details of the object, a colour theme of the object, a background colour theme of the object, subject matter of the object;
    receiving, by the processor, details related to the object from a user, wherein the details comprise at least one of a description of the object, contact information of the user, price of the object, web link to a site providing information about the object, e-commerce link to purchase the object, a link to enable receiving information about the object on a user device, audio related to the object, video related to the object, and text related to the object;
    storing, by the processor, the details related to the object into the repository;
    determining, by the processor, a symbol encoding an identifier of the image and a location of the repository where the image and the details related to the object present in the image are stored, wherein the symbol is at least one of a bar code, Quick Response (QR) code, photosymbol, and a hologram;
    printing the symbol, by the user;
    attaching the symbol, on the image, by the user;
    receiving, by the processor, a user request to access the details of the object, wherein the user request is placed by at least one of the user and another user, and wherein the user request comprises the symbol present in a scanned format; and
    directing, by the processor, at least one of the user and another user to the location of the repository, based on the user request, thereby allowing access of the details related to the object.

8. The method of claim 7, wherein the object present in the image is analysed using a scanning technique selected from a group consisting of pixel to pixel recognition, hash based search, Hugh transform, and geometry consistency.

9. The method of claim 7, further comprising matching the symbol with the object to create the symbol of a colour similar to the object while embedding the symbol on the image.

10. The method of claim 7, further comprising editing the symbol for changing a size, location, and orientation of the symbol and changing an image present in the symbol.

11. The method of claim 7, further comprising suggesting a location for embedding the symbol on the image.

12. The method of claim 7, further comprising inserting the object present in the image, in the QR code.

13. A system for accessing details of an object present in an image, the system comprising:
    an image capturing unit for capturing an image of an object, and
    a processor; and
    a memory coupled to the processor, wherein the processor is capable of executing programmed instructions stored in the memory to:
    store the image into a repository;
    analyse the object present in the image to determine features comprising size details of the object, a colour theme of the object, a background colour theme of the object, subject matter of the object;
    receive details related to the object from a user, wherein the details comprise at least one of a description of the object, contact information of the user, price of the object, web link to a site providing information about the object, e-commerce link to purchase the object, a link to enable receiving information about the object on a user device, audio related to the object, video related to the object, and text related to the object;
    store the details related to the object into the repository;
    determine a symbol encoding an identifier of the image and a location of the repository where the image and the details related to the object present in the image are stored, wherein the symbol is at least one of a bar code, Quick Response (QR) code, photosymbol, and a hologram;
    embed the symbol on the image based on at least one of predefined user preferences, a user input, and analysis of the image by the processor;
    receive a user request to access the details of the object, wherein the user request is placed by at least one of the user and another user, and wherein the user request comprises the symbol present in a scanned format, and
    direct at least one of the user and another user to the location of the repository, based on the user request, thereby allowing access of the details related to the object.

14. The system of claim 13, wherein the object present in the image is analysed using a scanning technique selected from a group consisting of pixel to pixel recognition, hash based search, Hugh transform, and geometry consistency.

15. The system of claim 13, further comprising matching the symbol with the object to create the symbol of a colour similar to the object while embedding the symbol on the image.

16. The system of claim 13, further comprising editing the symbol for changing a size, location, and orientation of the symbol and changing an image present in the symbol.

17. The system of claim 13, further comprising suggesting a location for embedding the symbol on the image.

18. The system of claim 13, further comprising inserting the object present in the image, in the QR code.

19. The system of claim 13, further comprising allowing the user to print the symbol.

20. The system of claim 19, further comprising allowing the user to attach the symbol, on the image.

* * * * *